US006249789B1

(12) United States Patent
Delia et al.

(10) Patent No.: US 6,249,789 B1
(45) Date of Patent: Jun. 19, 2001

(54) METHOD OF CALCULATING TIME-SENSITIVE WORK ALGORITHMS USING INPUTS WITH DIFFERENT VARIABLE EFFECTIVE INTERVALS

(75) Inventors: Wayne M. Delia; Wayne Diehl, both of Poughkeepsie; Francis X. Havko, Newburgh, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,851

(22) Filed: Nov. 23, 1999

(51) Int. Cl.$^7$ ....................................... G06F 12/30
(52) U.S. Cl. ................................. 707/102; 707/6
(58) Field of Search .......................... 707/102, 6

(56) References Cited

U.S. PATENT DOCUMENTS

| | | | |
|---|---|---|---|
| 4,202,048 | * 5/1980 | Edwards | 367/40 |
| 4,484,290 | 11/1984 | Bagnall et al. . | |
| 4,646,241 | 2/1987 | Ratchford et al. . | |
| 4,660,145 | 4/1987 | Hansen . | |
| 5,418,931 | 5/1995 | Moorby . | |
| 5,507,786 | 4/1996 | Morgan et al. . | |
| 5,523,942 | * 6/1996 | Tyler et al. | 705/4 |
| 5,613,113 | * 3/1997 | Goldring | 707/202 |
| 6,052,688 | * 4/2000 | Thorsen | 707/100 |
| 6,150,598 | * 11/2000 | Suzuki et al. | 84/603 |

FOREIGN PATENT DOCUMENTS 08272403   10/1996   (JP) .
1807497    4/1993    (SU) .

* cited by examiner

Primary Examiner—Wayne Amsbury
(74) Attorney, Agent, or Firm—DeLio & Peterson, LLC; Peter W. Peterson; Jay H. Anderson

(57) ABSTRACT

A computer program storage device having a program of instructions executable to perform a method of determining time sensitive values for multiple parametric data having different variable effective intervals. The program is adapted to access a database containing i) parametric data values of a first work factor for a plurality of continuous time intervals and ii) parametric data values of a second work factor for a plurality of continuous time intervals, at least one time interval of the second work factor being different from a time interval of the first work factor. The method comprises reading the parametric data values of the first work factor for a plurality of continuous time intervals; reading the parametric data values of the second work factor for a plurality of continuous time intervals; subdividing at least one time interval of the first work factor or the second work factor into at least two subdivided time intervals so that time intervals of the first work factor correspond to time intervals of the second work factor; and determining parametric data values for the subdivided time intervals of the first work factor or the second work factor. Thereafter the method includes designating a start date and an end date of desired work data based on the first and second work factors and determining work data by applying an algorithm to the parametric data of the first and second work factors for corresponding time intervals between the start date and the end date.

20 Claims, 3 Drawing Sheets

Time Line of Data Values in Subdivided Time Periods

```
STARTS:   Undefined  |  1200  |  1600  |  2400  |  Undefined
         00/00    01/00   02/00    03/00    04/00       99/99

LABSTD:      1.50   |   1.50  |  1.50  |  1.00  |   1.00
         00/00    01/00   02/00    03/00    04/00       99/99

WEIGHT:      2.00   |   2.00  |  2.00  |  2.00  |   2.00
         00/00    01/00   02/00    03/00    04/00       99/99

REQFACT:     1.00   |   1.00  |  1.00  |  1.00  |   1.00
         00/00    01/00   02/00    03/00    04/00       99/99
```

METHOD OF CALCULATING TIME-SENSITIVE WORK ALGORITHMS USING INPUTS WITH DIFFERENT VARIABLE EFFECTIVE INTERVALS

BACKGROUND OF THE INVENTION

1. Field of the Invention

The present invention relates to a method and computer program for calculating time sensitive algorithms to be used in business process planning and, in particular, to those algorithms used for planning manufacturing processes based on time-sensitive data.

2. Description of Related Art

Business planning application systems typically deal with a similar general data architecture. In a relational database environment, the information is stored with two characteristics: first, a key structure made up of a combination of one or more key fields to uniquely identify records, and second, the information identified by the key fields is effective for one or more future time periods. For example, a manufacturing organization can gather and process sector yield information which is uniquely identified by a plan identification, product identification, process center, and sector. The yield information and other parametric data, e.g., operational parameters such as productivity, labor rates, cost of materials, overhead costs and the like, can take on different values in different time periods. The time periods over which such parametric data changes may not be the same for each data component.

In storing and accessing planning application information, it is important to optimize the data storage of constant or varying parametric data over future time periods. The problem is particularly important in the connection with time-sensitive parametric data of the types mentioned above. It would be useful to be able to extract discrete time-period information from a continuous variable time period interval which preserves the storage optimization and permits parametric data in different variable time period intervals to be combined in an algorithmic computation.

Bearing in mind the problems and deficiencies of the prior art, it is therefore an object of the present invention to provide an improved method of dealing with time-sensitive parametric data in business planning applications.

It is another object of the present invention to provide a method and computer program for calculating work algorithms which permits parametric data in different variable time period intervals to be combined in an algorithmic computation.

A further object of the invention is to provide a method and computer program for calculating work algorithms which does not require restricting time-sensitive data to the same rigid, fixed intervals for each parametric data record.

It is yet another object of the present invention to provide a method and computer program for calculating work algorithms which permits use of variable time intervals, and overcomes the difficulty of combining parametric data stored in variable intervals which are not necessarily the same.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of combining parametric data from a first record having data values for a plurality of time intervals and a second record having data values for a plurality of time intervals, the time intervals of the second record not all corresponding to the time intervals of the first record. The method comprises comparing the time intervals of the first record with the time intervals of the second record and determining which time intervals of each of the first and second records do not correspond with time intervals of the other record. The method then includes subdividing one or more time intervals of the first record or the second record into subdivided time intervals so that time intervals of the first record correspond to time intervals of the second record and determining parametric data values for the subdivided time intervals of the first record or the second record. The method finally includes selecting a start date and an end date of desired data based on the first and second records and determining combined data for the first and second records by applying an algorithm to the parametric data of the first and second records for corresponding time intervals between the start date and the end date.

In another aspect, the present invention includes a program storage device readable by a machine, wherein the device has a program of instructions executable by the machine to perform a method of determining time sensitive values for multiple parametric data having different variable effective intervals, the program adapted to access a database containing a first record having data values for a plurality of time intervals and a second record having data values for a plurality of time intervals, the time intervals of the second record not all corresponding to the time intervals of the first record. The method performed by the program comprises comparing the time intervals of the first record with the time intervals of the second record and determining which time intervals of each of the first and second records do not correspond with time intervals of the other record. The method then includes subdividing one or more time intervals of the first record or the second record into subdivided time intervals so that time intervals of the first record correspond to time intervals of the second record and determining parametric data values for the subdivided time intervals of the first record or the second record. Finally, the method includes the steps of designating a start date and an end date of desired data based on the first and second records and determining combined data or the first and second records by applying an algorithm to the parametric data of the first and second records for corresponding time intervals between the start date and the end date.

Preferably, at least one time interval of both the first and second records is subdivided into at least two subdivided time intervals so that the time intervals of the second record correspond to time intervals of the first record and parametric data values of both the first and second records are determined for the subdivided time intervals. The start and end dates correspond to the time intervals of the first and second records.

More preferably, the method includes the steps of determining parametric data values of additional records for a plurality of continuous time intervals, at least one time interval of the additional records being different from a time interval of the first record and the second record; determining parametric data values of additional records for the subdivided time intervals and applying the algorithm to the parametric data of the additional records for corresponding time intervals between the start date and the end date.

In a related aspect, the present invention provides a computer program product comprising a computer usable medium having computer readable program code means embodied in the medium for determining time sensitive values for multiple parametric data having different variable effective intervals. The program is adapted to access a database containing a first record having data values for a plurality of time intervals and a second record having data values for a plurality of time intervals, the time intervals of the second record not all corresponding to the time intervals of the first record. The computer program product includes computer readable program code means for practicing the aforementioned method steps.

Another aspect of the present invention relates to a method of determining time sensitive values for multiple parametric data having different variable effective intervals comprising determining parametric data values of a first work factor for a plurality of continuous time intervals; determining parametric data values of a second work factor for a plurality of continuous time intervals, at least one time interval of the second work factor being different from a time interval of the first work factor; subdividing at least one time interval of the first work factor or the second work factor into at least two subdivided time intervals so that time intervals of the first work factor correspond to time intervals of the second work factor; and determining parametric data values for the subdivided time intervals of the first work factor or the second work factor. After selecting a start date and an end date of desired work data based on the first and second work factors the method further includes determining work data by applying an algorithm to the parametric data of the first and second work factors for corresponding time intervals between the start date and the end date.

Another related aspect of the present invention provides a program storage device readable by a machine, wherein the device has a program of instructions executable by the machine to perform a method of determining time sensitive values for multiple parametric data having different variable effective intervals. The program is adapted to access a database containing i) parametric data values of a first work factor for a plurality of continuous time intervals and ii) parametric data values of a second work factor for a plurality of continuous time intervals, at least one time interval of the second work factor being different from a time interval of the first work factor. The method comprises reading the parametric data values of the first work factor for a plurality of continuous time intervals; reading the parametric data values of the second work factor for a plurality of continuous time intervals; subdividing at least one time interval of the first work factor or the second work factor into at least two subdivided time intervals so that time intervals of the first work factor correspond to time intervals of the second work factor; and determining parametric data values for the subdivided time intervals of the first work factor or the second work factor. Thereafter the method includes designating a start date and an end date of desired work data based on the first and second work factors and determining work data by applying an algorithm to the parametric data of the first and second work factors for corresponding time intervals between the start date and the end date.

The method may also include the step of subdividing at least one time interval of both the first and second work factors into at least two subdivided time intervals so that the time intervals of the second work factor correspond to time intervals of the first work factor and determining parametric data values of both the first and second work factors for the subdivided time intervals. The start and end dates preferably correspond to time intervals of the first and second work factors. More preferably, the method includes the steps of determining parametric data values of additional work factors for a plurality of continuous time intervals, at least one time interval of the additional factors being different from a time interval of the first work factor and the second work factor; determining parametric data values of additional work factors for the subdivided time intervals; and applying the algorithm to the parametric data of the additional work factors for corresponding time intervals between the start date and the end date.

A computer program product is provided in a further aspect wherein the product comprises a computer usable medium having computer readable program code means embodied in the medium for determining time sensitive values for multiple parametric data having different variable effective intervals. The program is adapted to access a database containing i) parametric data values of a first work factor for a plurality of continuous time intervals and ii) parametric data values of a second work factor for a plurality of continuous time intervals, at least one time interval of the second work factor being different from a time interval of the first work factor. The computer program product including computer readable program code means for performing the aforementioned method steps.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
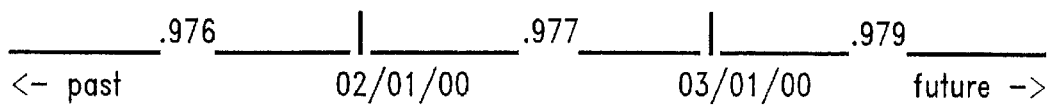
FIG. 1 is a time line showing yield values using variable time intervals.

In describing the preferred embodiment of the present invention, reference will be made herein to FIGS. 1–6 of the drawings in which like numerals refer to like features of the invention. Features of the invention are not necessarily shown to scale in the drawings.

Different methods for storing and accessing planning application information are disclosed in connection with the present invention, and a preferred method is identified for optimizing the data storage of constant or varying data over future time periods. The problem of the use of time-sensitive parametric data is overcome by the methods and program of the present invention which enables the user to extract discrete time-period information from a continuous variable time period interval while preserving the storage optimization, and permits parametric data in different variable time period intervals to be combined in an algorithmic computation. As used herein, the term parametric data refers to information pertaining to operational characteristics of the type which would normally be employed in planning business/work processes, such as cost, yield, personnel and other components or factors which enter into manufacturing planning.

EXAMPLE 1

Time Period Identifiers (Buckets)

In this example, there is assigned a value to a specific time period for a set of records identified by key fields, which is illustrated in the following Table 1:

TABLE 1

Time-Sensitive Yield Data Stored by T/P Bucket with Single Default

| Key Fields | | | | | |
|---|---|---|---|---|---|
| Plan ID | Product ID | ProcessCenter | Sector | T/P Bucket | Yield |
| A1 | CO2 | J3 | 127 | 0 | 0.979 |
| A1 | CO2 | J3 | 127 | 1 | 0.976 |
| A1 | CO2 | J3 | 127 | 2 | 0.977 |
| A1 | CO2 | J3 | 143 | 0 | 0.990 |

The value of 0 in the time period (T/P) Bucket field of the first and fourth record indicates that the yield value is used as a default value for all defined timer periods for that set of key fields. The default is used unless overridden by explicit non-zero T/P buckets, as in the second and third records. The time periods are defined in a separate Table 2 as illustrated below:

TABLE 2

Plan Calendar Reference Table

| PlanID | T/P Bucket | T/P Label |
|---|---|---|
| A1 | 1 | Jan2000 |
| A1 | 2 | Feb2000 |
| A1 | 3 | Mar2000 |
| A1 | 4 | Apr2000 |

An advantage of this approach includes an economy of storage space in the database detail table, and a capability of assigning a default value for parametric data which is relatively unchanging across the plan horizon. For example, a product with a fixed structure which is not expected to change for the life cycle of the product would have a single default-value identified by T/P bucket 0. However, data stored in this fashion must be converted from the time-period bucket numbers to the corresponding timer period labels by a join to the calendar reference table each time the data is required for presentation, editing, or use in an application program. Another disadvantage is that the bucket numbers for a particular plan will not necessarily correspond to the bucket numbers of another plan. Also, only one default value is assignable, so all deviations from the default value of a set of key fields will require a single record for each differing time period.

EXAMPLE 1A

Absolute Master Calendar Time Period Identifiers

This method is very similar to Example 1 (Time Period Identifiers) except that the identification of time period buckets is standardized across all different plans. This method features the same space optimization and single-default specification capabilities, while improving on Example 1 by permitting "delta analysis" or plan-to-plan comparisons of data in the same time periods. However, the disadvantage of the necessary translations of the data for presentation, editing, or used in an application program, and the single-default limitation remain.

EXAMPLE 2

Horizontal Calendar Representation

This method establishes a much wider record with a column for each defined time period. A single record is required for each unique set of key values. The same yield data presented in the example given in Table 1 would be transformed to the following structure shown in Table 3, in which identical coded time period labels (TP01, TP02, etc.) are established for each data record:

TABLE 3

Time-Sensitive Yield Data Stored in Horizontal T/P Columns

| Key Fields | | | | | | | |
|---|---|---|---|---|---|---|---|
| PlanID | ProductID | ProcCenter | Sector | TP01 | TP02 | TP03 | TP04 |
| A1 | CO2 | J3 | 127 | 0.976 | 0.977 | 0.979 | 0.979 |
| A1 | CO2 | J3 | 143 | 0.990 | 0.990 | 0.990 | 0.990 |

This approach removes the disadvantage of requiring table joins and intricate data reformatting for report presentation, editing, and use in an application program, since the data is already in the desired horizontal layout. Table 3 shows that the necessary number of records is reduced to a single record needed to completely characterize the data variation over the entire plan calendar horizon. If there are fewer timer periods than there are available columns in the table, the rightmost columns are filled with null values. However, this method is very inefficient for storing the flat (stable, or unchanging) parametric data. As seen in the second record, the default value of 0.990 must be entered in each column for each coded time period, instead of specifying it once as was possible in Example 1. The plan calendar reference table (Table 2) must be queried to determine the association of the coded table time period column labels (TP01, TP02, etc.) with the corresponding understandable time period labels (Jan2000, Feb2000, etc.). Another disadvantage is the difficulty of performing the plan-to-plan comparisons made possible in Example 1A, since the values in any arbitrary T/P column for one plan does not necessarily represent the same timer period in another plan. An even greater disadvantage is that if a plan requires more time periods than there are available columns in the table, then the table must be physically altered and expanded with extra columns to contain the data. For very large tables or highly-populated tables, this quickly becomes a database administration burden.

EXAMPLE 3

Time-Sensitive Data Tagged with Effective Start and End Dates

A preferred method and program for storage of time-sensitive data involves the architecture in the following example. This method assigns a data value to a variable time period identified by an effective starting date and an effective ending date. The time period interval is of no pre-determined duration, so values can be assigned as defaults for the entire horizon or can be specified for very narrow intervals of time. A null value in the effective start (EffStart) field indicates that the given data value is in effect for all dates prior to (and including) the specified effective end (EffEnd) date. Similarly, a null value in the EffEnd field indicates that the given data value is in effect for all dates on or after the specified EffStart date. The data records may be laid out as shown in Table 4 for the work parameter or algorithm component example of product yield:

TABLE 4

Time-Sensitive Data featuring Effective Start and End Dates

| Key Fields | | | | | | |
|---|---|---|---|---|---|---|
| PlanID | ProductID | ProcessCenter | Sector | EffStart | EffEnd | Yield |
| A1 | C02 | J3 | 127 | (null) | 2000-01-30 | 0.976 |
| A1 | C02 | J3 | 127 | 2000-02-01 | 2000-02-29 | 0.977 |
| A1 | C02 | J3 | 127 | 2000-03-01 | (null) | 0.979 |
| A1 | C02 | J3 | 143 | (null) | (null) | 0.990 |

In the fourth record, the (null) value in both the EffStart and EffEnd fields indicates that the yield value for that combination of key fields is constant and in effect for any timer period. In the first three records, the values of the EffStart and EffEnd fields indicate the pattern of yield data values over time as shown in FIG. 1, where the time line is shown at the bottom in MM/DD/YY convention and the particular parametric data of product or process sector yield is shown at the top.

Table 4 is the preferred method of storing time-sensitive data for a variety of reasons. First, the information contained in the record is intuitive and natural for interpretation, and would be stated by a user as follows: "The following value (Yield) applies to the following key fields (PlanID, ProductID, ProcessCenter, Sector) beginning on date (EffStart) and ending on date (EffEnd)." Second, no separate plan calendar reference, such as shown in Table 2, needs to be joined to the data table, as the explicit dates are included in the record. Third, if relatively flat parametric data is involved, which changes only once, the data can be represented as a combination of two default values in two separate records, which is not possible in Examples 1 and 1A. Redundant data values in consecutive time periods can be combined, which is not possible in Example 2 since that example requires an explicit value of the data value in each standard time period. Third, this arrangement of data is easily adaptable to report presentation and input data editing. Fourth, since the time period intervals are specified with explicit start and end dates corresponding to the YYYY-MM-DD convention, no translation is necessary in comparing data in different fields or combining different parameters in a single calculation. Finally, no physical alteration of the database is necessary to adapt to additional time periods as is required in Example 2.

This method of the present invention is particularly useful because retrieving a specific data value from a database table for a specific point in time involves only a moderately complex query which selects the single record where the effective starting date is before a given date (EffStart=NULL or EffStart<given date) and the effective ending date is after a given date (EffEnd=NULL or EffEnd>given date). As an illustration, the records in the table in Table 4 may be queried to find the yield value for 20000-03-15. Issuing the query to find all records where (EffStart=NULL or EffStart<2000-03-15) and (EffEnd=NULL or EffEnd>2000-03-15) and (PlanID='A1' and ProductID='C02' and ProcessCenter='J3' and Sector=143) results in the retrieval of a third record, which turns out to be the value 0.979, effective beginning 2000-03-01 with no specified effective end date.

While it may appear to be necessary to ensure that all time periods are covered, depending on the application real-world interpretation of the key field values, this requirement may not be necessary. For example, leaving a product's parametric data undefined during periods in which the product was not produced may enable the application to justifiably neglect the calculation for the product in those times periods.

Another area of caution is the possibility of overlapping time intervals with conflicting data values, but this may be placed under the control of the application program to ensure the integrity of the data.

The present invention is particularly useful in evaluating parametric data having time-sensitive data in planning applications. Business planning programs which use time-period sensitive data in calculations and storage of the results of algorithms may need to use different types of parametric data which may be expressed in variable intervals which do not match up with each other. The present invention discloses a program subroutine that will resolve such a problem, and provides a method and program which combines parametric data with time periods defined by effective start/end dates that do not necessarily align with each other. This is accomplished through a method, executed for example by subroutine within a computer program, which gathers the appropriate data, breaks down the parametric data into subdivisions of their defined time period intervals which align with other parameters, perform the calculations within each subdivided time period, and finally tabulates or rolls up the output data into effective start/end time periods for reporting, storage, or further processing.

The present invention is particularly effective in computations involving parametric data elements having a constant value over a discrete time interval (and having an effective start time and an effective end time), and permits the combination of this data value over a desired time interval with other parametric data which do not share the same effective start and end times for each time interval. Preferably, the time intervals in any particular data record are continuous.

EXAMPLE 3A

While any time-sensitive algorithms may be calculated for inputs having different variable effective time intervals, a preferred application is in the planning and calculation of manufacturing processes, where the workload or cost parameters which make up the algorithm components comprise numerous manufacturing and overhead parameters. As an illustration, an algorithm for calculation of a starts-driven direct workload calculation has the following formula:

DIRWKLD=STARTS*LABSTD*WEIGHT*REQFACT/800 where DIRWKLD is the direct workload, STARTS is the number of parts started in the work process, LABSTD is the number of workers needed to process the part, WEIGHT is the difficulty weighting factor and REQFACT is the cost of the part.

As an illustration, the following records as shown in Table 5 are on file in the Time-Sensitive Effective Start/End format of Example 3:

TABLE 5

Time-Sensitive Data Featuring Effective Start and End Dates

| Key Fields | | | | | | | |
|---|---|---|---|---|---|---|---|
| PlanID | ProductID | ProcCent | Sector | Parm | EffStart | EffEnd | Value |
| A1 | C02 | J3 | 127 | STARTS | 2000-01-01 | 2000-01-30 | 1200 |
| A1 | C02 | J3 | 127 | STARTS | 2000-02-01 | 2000-02-29 | 1600 |
| A1 | C02 | J3 | 127 | STARTS | 2000-03-01 | 2000-03-31 | 2400 |
| A1 | C02 | J3 | 127 | LABSTD | (null) | 2000-02-29 | 1.500 |
| A1 | C02 | J3 | 127 | LABSTD | 2000-03-01 | (null) | 1.000 |
| A1 | C02 | J3 | 127 | WEIGHT | (null) | (null) | 2.000 |
| A1 | C02 | J3 | 127 | REQFACT | (null) | (null) | 1.000 |

Figure 2:
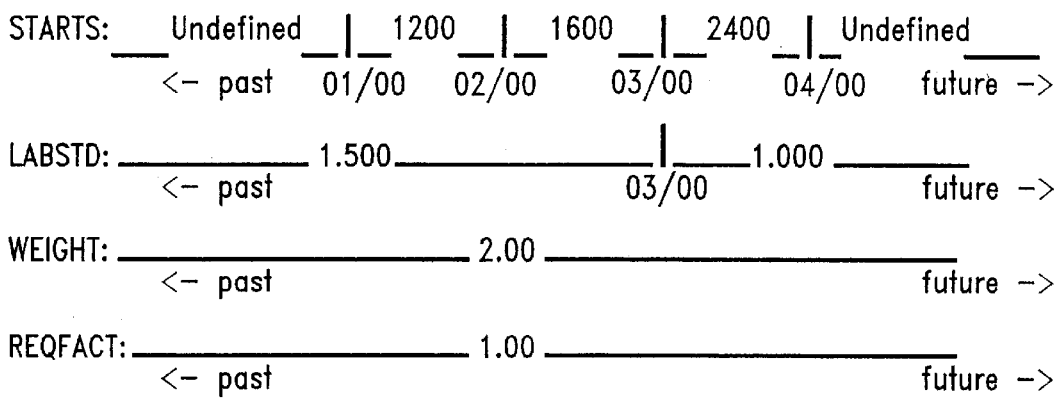
FIG. 2 is a time line showing parametric data values for an example calculating a direct workload algorithm.

FIG. 2 illustrates the time line of changing data values of the different parameters, and the mismatch of the boundaries of the variable time-period intervals.

Figure 3:
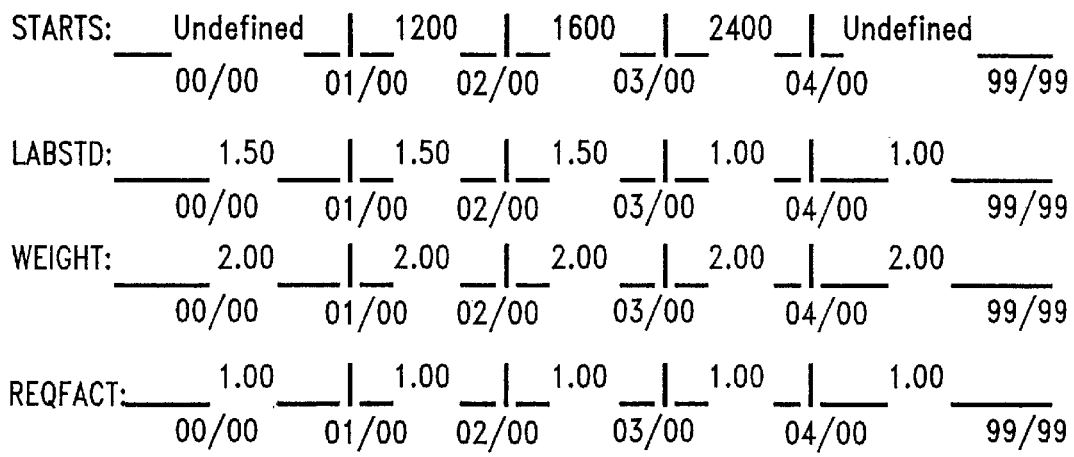
FIG. 3 is a time line of data values in subdivided time periods for the example of FIG. 2.

The program converts null values in the EffStart field to '0000-00-00' (which is not a valid date in most database manager programs, so that value cannot be stored on the database) and converts null values in the EffEnd field to '9999-99-99'. These values were selected to represent, respectively, the lowest and highest values in the sortable fields. The program determines all distinct values of effective start dates and effective end dates. These values represent the boundaries of the subdivided time periods. The unique boundary values of the time intervals are sorted from lowest to highest and processed from earliest to latest. The subdivided time periods are assigned the correct values placed in the appropriate subdivided time intervals, as illustrated in FIG. 3.

The method of the present invention applies the same single, non varying value to data for a particular time interval when the time intervals is subdivided to conform to time intervals of other data records. The value of a parameter datum between an effective start time and the corresponding effective end time is a constant value applicable to every point in time therebetween.

Figure 4:
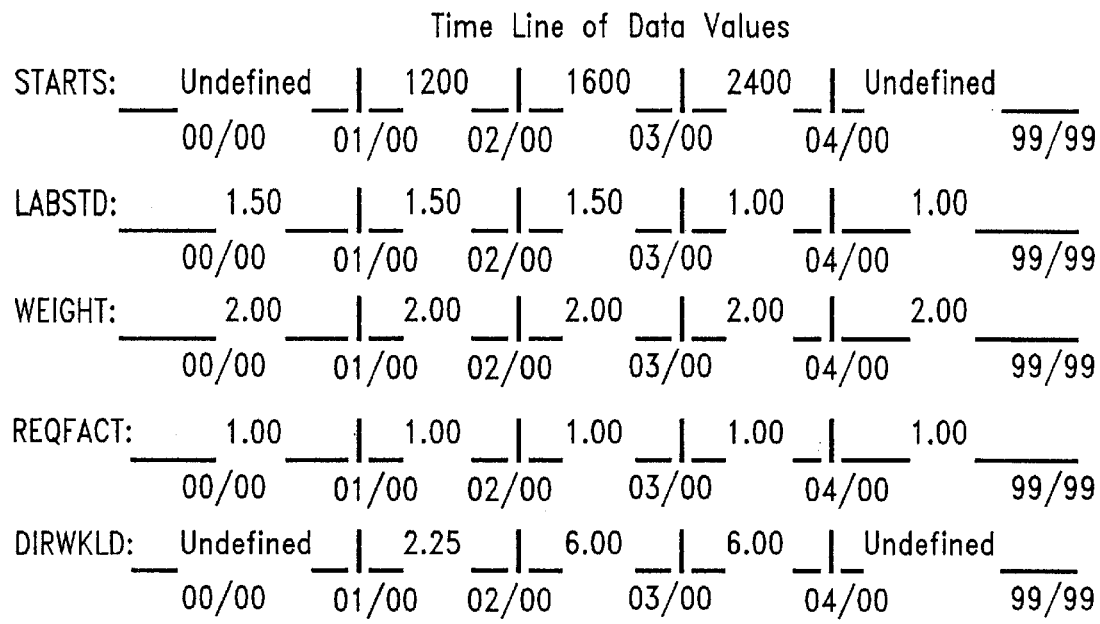
FIG. 4 is a time line of data values for the example of FIG. 2.
Figure 5:
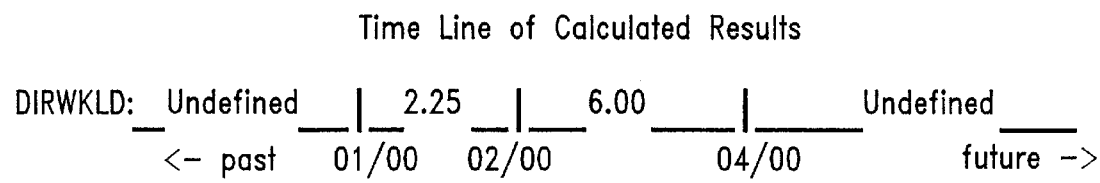
FIG. 5 is a time line of calculated results for the example of FIG. 2.

The program now applies the work planning algorithm to each of the subdivided time periods, with the convention that undefined values in any time period implies that the algorithm is not applied, such as the case where there are no starts, because the product is discontinued or not yet developed. The results of applying the algorithm to each subdivided time period is shown in FIG. 4.

Finally, the program tabulates or rolls up the resulting data into the optimal period effective start and end dates, and creates the appropriate output records for this combination of key values. The first effective start date is changed from 0000/00/00 to (NULL) if appropriate, and a similar change is made to the effective date.

The resulting data is now ready to be presented in a report, stored in an output table on a database, or used in further calculations.

The aforedescribed methods of calculating time sensitive algorithms with different variable effective intervals may be converted to any well-known program source code for execution by a computer. The present invention may be embodied as a computer program product and stored on a program storage device in computer source code, along with the database containing the records of the time sensitive parametric data which are required for calculation by the program algorithm. The program storage devices of the present invention may be devised, made and used as a component of a machine utilizing optics, magnetic properties and/or electronics to perform the method steps of the present invention. Program storage devices include, but are not limited to, magnetic diskettes, magnetic tapes, optical disks, Read Only Memory (ROM), floppy disks, semiconductor chips and the like.

Figure 6:
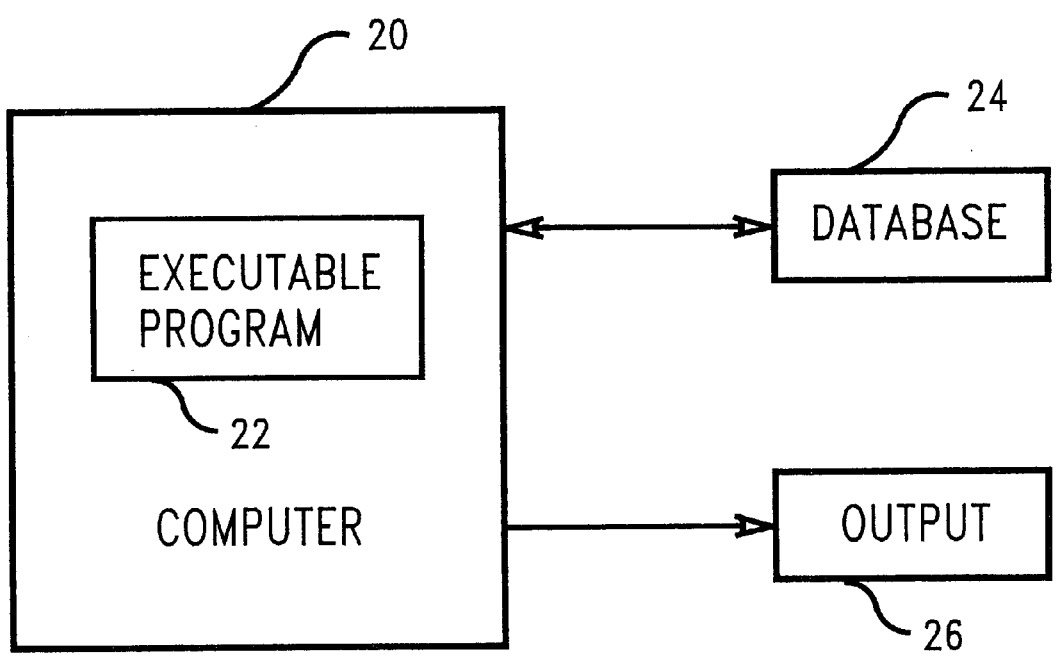
FIG. 6 is a schematic of a computer employing a program in source code which is capable of executing and calculating the time-sensitive work algorithms of the present invention.

FIG. 6 is a schematic representation of a computer system which may be used to practice the present invention. A computer 20 contains a microprocessor which is suitable to execute a program stored on a first program storage device 22. The methods of calculating time sensitive algorithms with different variable effective intervals of the present invention are converted by those skilled in the art of computer programming to a program source code stored within storage device 22. The executable program accesses the time-sensitive parametric data needed for calculation of the program algorithm from the same storage device or a different storage device 24 accessible by the computer. The computational results of the algorithm executed by the program are then transferred to any well known output device 26 such as a printer or visual display, or to another computer at the manufacturing site for execution of the work process.

The present invention achieves the objects set forth above. The method and program of the invention permit an optimization of time-sensitive data storage on database tables, and removes the disadvantages of restricting time-

TABLE 6

Final Data Records

| Key Fields | | | | | | | |
|---|---|---|---|---|---|---|---|
| PlanID | ProductID | ProCent | Sector | Parm | EffStart | EffEnd | Value |
| A1 | C02 | J3 | 127 | DIRWKLD | 2000-01-30 | 2000-01-30 | 2.250 |
| A1 | C02 | J3 | 127 | DIRWKLD | 2000-02-01 | 2000-03-31 | 6.000 | sensitive data to the same rigid, fixed intervals for each parametric data record. In evaluating and reconciling different parametric data records, the invention does not restrict the number of possible time intervals that individual data elements can have, nor does it require that any sequential time element be of any fixed duration. The invention allows different parametric data elements to be combined in an algorithmic calculation, regardless that the variable effective time intervals of the parameters are not necessarily the same. This provides advantages over other approaches to storing data with an "effective start date" and "effective end date" where the time intervals are explicitly fixed to conform to predetermined durations. The present invention succeeds in employing variable time intervals, despite the difficulty of combining parametric data stored in variable intervals which are not necessarily the same.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of combining parametric data from a first record having data values for a plurality of time intervals and a second record having data values for a plurality of time intervals, the time intervals of the second record not all corresponding to the time intervals of the first record, the method comprising:

comparing the time intervals of the first record with the time intervals of the second record;

determining which time intervals of each of the first and second records do not correspond with time intervals of the other record;

subdividing one or more time intervals of said first record or said second record into subdivided time intervals so that time intervals of said first record correspond to time intervals of said second record;

determining parametric data values for the subdivided time intervals of said first record or said second record;

selecting a start date and an end date of desired data based on said first and second records; and determining combined data for the first and second records by applying an algorithm to the parametric data of the first and second records for corresponding time intervals between said start date and said end date.

2. The method of claim 1 including the step of subdividing at least one time interval of both said first and second records into at least two subdivided time intervals so that the time intervals of said second record correspond to time intervals of said first record and determining parametric data values of both said first and second records for the subdivided time intervals.

3. The method of claim 2 wherein said start and end dates correspond to time intervals of the first and second records.

4. The method of claim 1 including the steps of determining parametric data values of additional records for a plurality of continuous time intervals, at least one time interval of said additional records being different from a time interval of said first record and said second record; determining parametric data values of additional records for the subdivided time intervals; and applying said algorithm to the parametric data of the additional records for corresponding time intervals between said start date and said end date.

5. A program storage device readable by a machine, said device having a program of instructions executable by the machine to perform a method of determining time sensitive values for multiple parametric data having different variable effective intervals, said program adapted to access a database containing a first record having data values for a plurality of time intervals and a second record having data values for a plurality of time intervals, the time intervals of the second record not all corresponding to the time intervals of the first record, said method comprising:

comparing the time intervals of the first record with the time intervals of the second record;

determining which time intervals of each of the first and second records do not correspond with time intervals of the other record;

subdividing one or more time intervals of said first record or said second record into subdivided time intervals so that time intervals of said first record correspond to time intervals of said second record;

determining parametric data values for the subdivided time intervals of said first record or said second record;

designating a start date and an end date of desired data based on said first and second records; and determining combined data for the first and second records by applying an algorithm to the parametric data of the first and second records for corresponding time intervals between said start date and said end date.

6. The program storage device of claim 5 wherein the method includes the step of subdividing at least one time interval of both said first and second records into at least two subdivided time intervals so that the time intervals of said second record correspond to time intervals of said first record and determining parametric data values of both said first and second records for the subdivided time intervals.

7. The program storage device of claim 5 wherein said start and end dates correspond to time intervals of the first and second records.

8. The program storage device of claim 5 wherein the method includes the steps of determining parametric data values of additional records for a plurality of continuous time intervals, at least one time interval of said additional records being different from a time interval of said first record and said second record; determining parametric data values of additional records for the subdivided time intervals; and applying said algorithm to the parametric data of the additional records for corresponding time intervals between said start date and said end date.

9. A computer program product comprising a computer usable medium having computer readable program code means embodied in said medium for determining time sensitive values for multiple parametric data having different variable effective intervals, said program adapted to access a database containing a first record having data values for a plurality of time intervals and a second record having data values for a plurality of time intervals, the time intervals of the second record not all corresponding to the time intervals of the first record, said computer program product including:

a computer readable program code means for comparing the time intervals of the first record with the time intervals of the second record;

a computer readable program code means for determining which time intervals of each of the first and second records do not correspond with time intervals of the other record;

a computer readable program code means for subdividing one or more time intervals of said first record or said second record into subdivided time intervals so that time intervals of said first record correspond to time intervals of said second record;

a computer readable program code means for determining parametric data values for the subdivided time intervals of said first record or said second record;

a computer readable program code means for designating a start date and an end date of desired data based on said first and second records; and a computer readable program code means for determining combined data for the first and second records by applying an algorithm to the parametric data of the first and second records for corresponding time intervals between said start date and said end date.

10. The computer program product of claim 9 further including computer readable program code means for determining parametric data values of additional records for a plurality of continuous time intervals, at least one time interval of said additional records being different from a time interval of said first record and said second record; computer readable program code means for determining parametric data values of additional records for the subdivided time intervals; and computer readable program code means for applying said algorithm to the parametric data of the additional records for corresponding time intervals between said start date and said end date.

11. A method of determining time sensitive values for multiple parametric data having different variable effective intervals comprising:

determining parametric data values of a first work factor for a plurality of continuous time intervals;

determining parametric data values of a second work factor for a plurality of continuous time intervals, at least one time interval of said second work factor being different from a time interval of said first work factor;

subdividing at least one time interval of said first work factor or said second work factor into at least two subdivided time intervals so that time intervals of said first work factor correspond to time intervals of said second work factor;

determining parametric data values for the subdivided time intervals of said first work factor or said second work factor;

selecting a start date and an end date of desired work data based on said first and second work factors; and determining work data by applying an algorithm to the parametric data of the first and second work factors for corresponding time intervals between said start date and said end date.

12. The method of claim 11 including the step of subdividing at least one time interval of both said first and second work factors into at least two subdivided time intervals so that the time intervals of said second work factor correspond to time intervals of said first work factor and determining parametric data values of both said first and second work factors for the subdivided time intervals.

13. The method of claim 12 wherein said start and end dates correspond to time intervals of the first and second work factors.

14. The method of claim 11 including the steps of determining parametric data values of additional work factors for a plurality of continuous time intervals, at least one time interval of said additional factors being different from a time interval of said first work factor and said second work factor; determining parametric data values of additional work factors for the subdivided time intervals; and applying said algorithm to the parametric data of the additional work factors for corresponding time intervals between said start date and said end date.

15. A program storage device readable by a machine, said device having a program of instructions executable by the machine to perform a method of determining time sensitive values for multiple parametric data having different variable effective intervals, said program adapted to access a database containing i) parametric data values of a first work factor for a plurality of continuous time intervals and ii) parametric data values of a second work factor for a plurality of continuous time intervals, at least one time interval of said second work factor being different from a time interval of said first work factor, said method comprising:

reading the parametric data values of the first work factor for a plurality of continuous time intervals;

reading the parametric data values of the second work factor for a plurality of continuous time intervals;

subdividing at least one time interval of said first work factor or said second work factor into at least two subdivided time intervals so that time intervals of said first work factor correspond to time intervals of said second work factor;

determining parametric data values for the subdivided time intervals of said first work factor or said second work factor;

designating a start date and an end date of desired work data based on said first and second work factors; and determining work data by applying an algorithm to the parametric data of the first and second work factors for corresponding time intervals between said start date and said end date.

16. The program storage device of claim 15 wherein the method includes the step of subdividing at least one time interval of both said first and second work factors into at least two subdivided time intervals so that the time intervals of said second work factor correspond to time intervals of said first work factor and determining parametric data values of both said first and second work factors for the subdivided time intervals.

17. The program storage device of claim 15 wherein said start and end dates correspond to time intervals of the first and second work factors.

18. The program storage device of claim 15 wherein the method includes the steps of determining parametric data values of additional work factors for a plurality of continuous time intervals, at least one time interval of said additional factors being different from a time interval of said first work factor and said second work factor; determining parametric data values of additional work factors for the subdivided time intervals; and applying said algorithm to the parametric data of the additional work factors for corresponding time intervals between said start date and said end date.

19. A computer program product comprising a computer usable medium having computer readable program code means embodied in said medium for determining time sensitive values for multiple parametric data having different variable effective intervals, said program adapted to access a database containing i) parametric data values of a first work factor for a plurality of continuous time intervals and ii) parametric data values of a second work factor for a plurality of continuous time intervals, at least one time interval of said second work factor being different from a time interval of said first work factor, said computer program product including:

a computer readable program code means for reading the parametric data values of the first work factor for a plurality of continuous time intervals;

a computer readable program code means for reading the parametric data values of the second work factor for a plurality of continuous time intervals;

a computer readable program code means for subdividing at least one time interval of said first work factor or said second work factor into at least two subdivided time intervals so that time intervals of said first work factor correspond to time intervals of said second work factor;

a computer readable program code means for determining parametric data values for the subdivided time intervals of said first work factor or said second work factor;

a computer readable program code means for designating a start date and an end date of desired work data based on said first and second work factors; and a computer readable program code means for determining work data by applying an algorithm to the parametric data of the first and second work factors for corresponding time intervals between said start date and said end date.

20. The computer program product of claim 19 further including computer readable program code means for determining parametric data values of additional work factors for a plurality of continuous time intervals, at least one time interval of said additional factors being different from a time interval of said first work factor and said second work factor; computer readable program code means for determining parametric data values of additional work factors for the subdivided time intervals; and computer readable program code means for applying said algorithm to the parametric data of the additional work factors for corresponding time intervals between said start date and said end date.

* * * * *